United States Patent [19]

Braschel et al.

[11] Patent Number: 5,230,550
[45] Date of Patent: Jul. 27, 1993

[54] METHOD OF CONTROLLING THE BRAKE PRESSURE IN THE REAR WHEEL BRAKES OF A DOUBLE-TRACK VEHICLE

[75] Inventors: Volker Braschel; Dieter Seitz, both of Neuwied, Fed. Rep. of Germany

[73] Assignee: Lucas Industries public limited company, Birmingham, England

[21] Appl. No.: 915,870

[22] Filed: Jul. 20, 1992

Related U.S. Application Data

[63] Continuation of Ser. No. 634,560, Dec. 27, 1990, abandoned.

[30] Foreign Application Priority Data

Dec. 29, 1989 [DE] Fed. Rep. of Germany ....... 3943308

[51] Int. Cl.[5] .............................................. B60T 8/82
[52] U.S. Cl. ..................................... 303/96; 303/111; 303/103; 364/426.02
[58] Field of Search ................. 303/93, 100, 103, 107, 303/111, 95, 96; 364/426.02

[56] References Cited

U.S. PATENT DOCUMENTS

| | | | |
|---|---|---|---|
| 4,320,459 | 3/1982 | Lindemann et al. | 303/111 X |
| 4,593,955 | 6/1986 | Leiber | 303/111 X |
| 4,852,953 | 8/1989 | Brearley et al. | 303/111 |
| 5,021,957 | 6/1991 | Yoshino et al. | 364/426.02 X |

FOREIGN PATENT DOCUMENTS

| | | |
|---|---|---|
| 2812000 | 9/1979 | Fed. Rep. of Germany . |
| 2830580 | 2/1980 | Fed. Rep. of Germany . |
| 2851107 | 2/1980 | Fed. Rep. of Germany . |
| 2320559 | 5/1987 | Fed. Rep. of Germany . |

Primary Examiner—Robert J. Oberleitner
Assistant Examiner—Lee W. Young
Attorney, Agent, or Firm—Oblon, Spivak, McClelland, Maier & Neustadt

[57] ABSTRACT

In a method of controlling the brake pressure in the rear wheel brakes of a double-track vehicle, wherein the rotational speeds at least of the rear wheels are measured and the brake pressure is lowered, kept constant, or raised, depending on the unstable or stable states arising at the individual rear wheels, the pressure in the brake of a stable rear wheel being approximated at least temporarily to the pressure in the brake of an unstable rear wheel, it is provided that, upon initiating a pressure decrease in the brake of an unstable rear wheel, the pressure in the brake of the stable rear wheel is kept constant for a predetermined period of time ($\Delta t$) and then decreased until the pressure in the brake of the unstable wheel is either kept constant or increased. This guarantees shorter stopping distances and at the same time provides a smaller difference in the braking torques at the rear axle, at good stability of the motor vehicle.

9 Claims, 6 Drawing Sheets

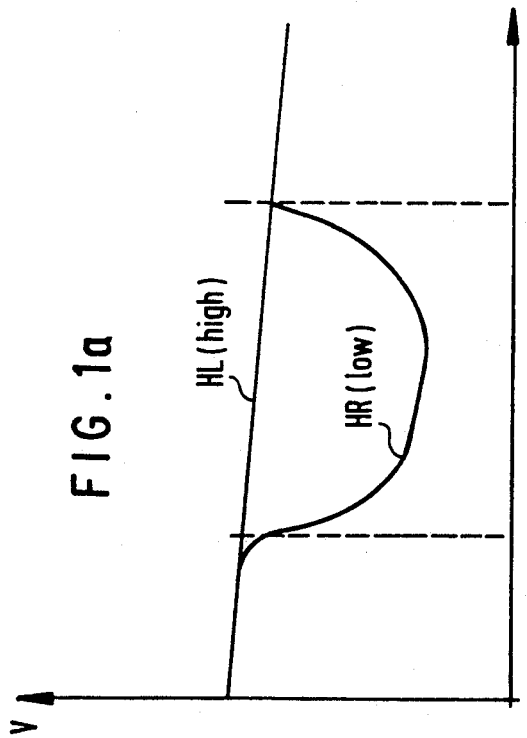
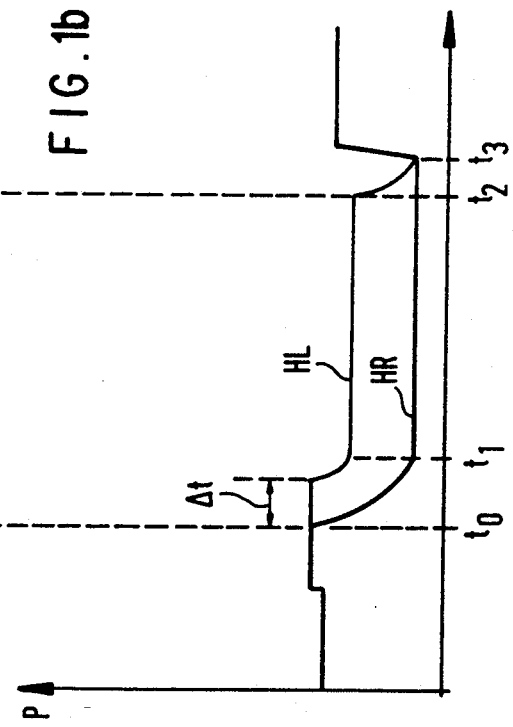
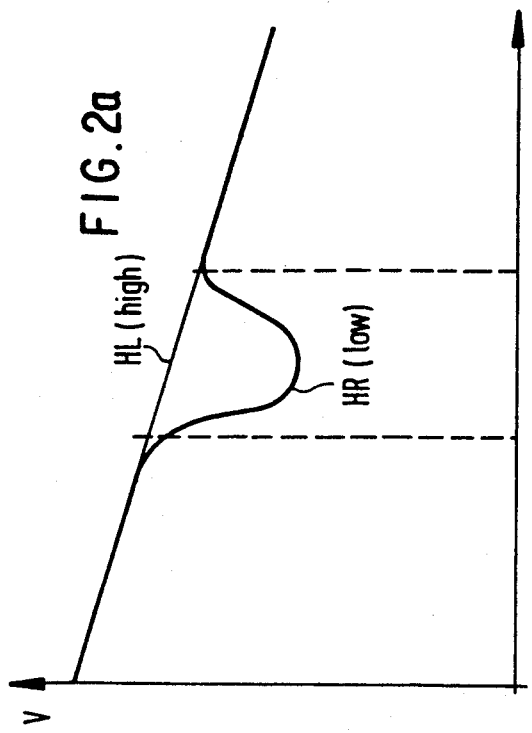
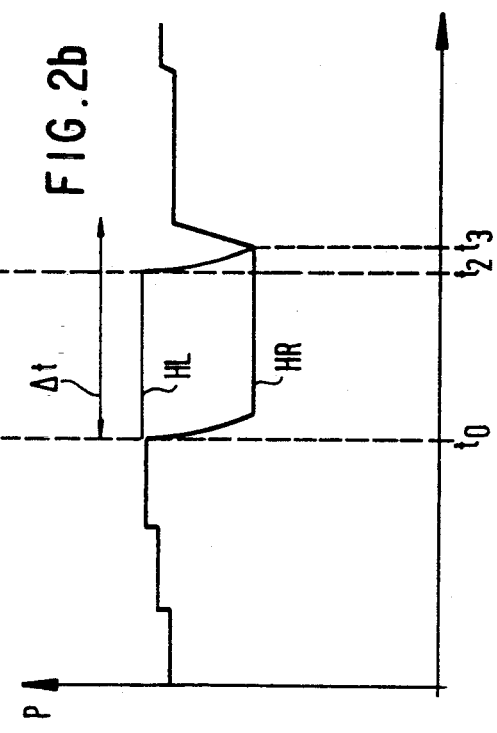

METHOD OF CONTROLLING THE BRAKE PRESSURE IN THE REAR WHEEL BRAKES OF A DOUBLE-TRACK VEHICLE

This application is a continuation of application Ser. No. 07/634,560, filed on Dec. 27, 1990, now abandoned.

FIELD OF THE INVENTION

The instant invention relates to a method of controlling the brake pressure in the rear wheel brakes of a double-track vehicle, wherein the rotational speeds at least of the rear wheels are measured and the brake pressure is lowered, kept constant, or raised, depending on the unstable or stable states arising at the individual rear wheels, the pressure in the brake of a stable rear wheel being approximated at least temporarily to the pressure in the brake of an unstable rear wheel.

Such a method is also known as a "select-low" method because the rotational behavior of a so-called "low" wheel is drawn upon to control also the pressure in the brake of the so-called "high" wheel. It helps prevent too great a torque about the vertical axis of the vehicle at the rear axle, when the coefficients of friction at the left and right rear wheels differ, as such a torque would deprive the motor vehicle of its driving stability.

A number of algorithms are known for control of the brake pressure in a motor vehicle braking system provided with antilock protection (ABS). The measuring means, valves, and control devices needed to carry out antilock brake control likewise are known in the most varied forms. Novel methods for control of the brake pressure in ABS applications are realized by corresponding programming of a processor while making use of known measuring and control means (rotational speed sensors, valves, etc.).

Attaining the aim of any ABS control, namely to achieve the shortest possible distance to stop while keeping the vehicle well steerable, is aggravated by the fact that the optimization of ABS control depends essentially on the road conditions and the status of the vehicle. The control always must be tuned to the respective prevailing circumstances, and those may change constantly and the data concerning them contained in the computer which governs the ABS braking are quite indirect only and scarce.

When a wheel tends to become locked due to its slipping or rotational retardation, that wheel is referred to as "unstable". On the other hand, if the rotational retardation or slip does not yet pose the risk of the wheel becoming locked, this wheel is called "stable".

It is known in the art to apply the above mentioned select-low control at the wheels of the rear axle of the motor vehicle so as to warrant good steerability (stability) of the vehicle. In select-low control it is assumed that a wheel of the rear axle of a double-track vehicle becomes unstable more quickly than another wheel. That may be so for a variety of reasons, such as different coefficients of friction of the road surface, different filling volumes of the wheel brake cylinders, different tolerances of the valve switching times or of the valve throttling. For such events, pure select-low control provides for antilock control to take place also at the wheel of the rear axle which still is turning stably, i.e. the pressure is reduced as it is at the unstable wheel.

True, pure select-low control of the type described above does have the advantage of enabling good driving stability of the motor vehicle. However, it also has the disadvantage that part of the stopping distance is given away because the stable rear wheel could be retarded more. The pressure decrease at the stable rear wheel, moreover, results in a greater difference of the brake torques at the rear axle, caused also by slipping of the so-called low wheel.

BACKGROUND OF THE INVENTION

DE-OS 28 30 580 describes a brake system with antilock control of a kind in which the select low control is modified so as to prolong the period of time of an initial supply of brake pressure into the brake of the so-called high wheel as compared to the brake pressure supply to the so-called low wheel.

DE-OS 28 12 000 also describes a modification of select-low control. At first the brake pressure in the so-called high wheel (the wheel turning on a higher coefficient of friction surface) is kept constant for a fixed period of time in order then to be raised pulsatingly so as to avoid yaw moments on road surfaces having different coefficients of friction for the left and right wheels of a vehicle axle.

As a result of the fixed given time span for keeping the brake pressure at a constant level for the high wheel, the braking can be adapted only insufficiently to different coefficients of friction of the road surface.

It is known from DE-OS 23 20 559 to provide for modified individual control such that the brake pressure at the wheel which is still stable but also subjected to control is maintained unchanged during the lowering of the brake pressure at the wheel risking to become locked.

In DE-PS 28 51 107 it is suggested not to decrease the brake pressure in the brake of the high wheel until the low wheel has become stable once more.

SUMMARY OF THE INVENTION

The invention is aimed at providing a method of controlling the brake pressure in the rear wheel brakes of a double-track vehicle which method will assure the shortest possible stopping distance at the greatest stability possible of the vehicle even if the coefficients of friction of the road surface are different.

That problem is solved, according to the invention, in that, upon initiating a pressure decrease in the brake of an unstable rear wheel, the pressure in the brake of the stable rear wheel is kept constant for a predetermined period of time and is subsequently lowered until the pressure in the brake of the unstable wheel is either kept constant or raised.

The expressions used above of "stable wheel" and "unstable wheel" may be replaced by the customary designations of "high wheel" and "low wheel".

In a preferred modification of the method according to the invention the brake pressure in the brake of the stable wheel is approximated to the pressure in the brake of a previously unstable wheel just before or when initiating a pressure increase in the brake of the previously unstable wheel, and following that the brake pressure is raised in both brakes.

The given period of time after which the pressure is lowered at the high wheel, although the high wheel still is stable, preferably is set at a range of from 20 to 80 milliseconds, more preferably from 30 to 50 milliseconds.

It is obvious that it is a condition for the control algorithms specified above that the stable wheel indeed is stable, i.e. that the evaluation of the rotational behavior of the stable wheel does not indicate that a slip or rotational retardation are of such magnitude as to require the lowering of pressure at the high wheel as well.

Another modification of the basic control algorithm described is made when the low wheel "recovers" rather quickly, i.e. is accelerated so much that soon it will again reach a stable range of the coefficient of friction/slip curve. Therefore, if the renewed acceleration of the low wheel, before termination of the predetermined time interval $\Delta t$, is above a predetermined threshold value, the brake presure of the high wheel will be adapted to that of the low wheel even before the end of the period $\Delta t$, namely just before the building up of pressure at the low wheel. Thus the pressures at the low and high rear wheels are increased in common, starting from the same level.

If the wheel being unstable for the moment (the low wheel) experiences reacceleration greater than a given value, subsequent to a pressure decrease, then an improved braking effect is obtained by virtue of at least one pressure build-up pulse being fed into the brake of the stable wheel and/or the wheel being unstable for the moment. Preferably both the low and high wheels are given such a pressure build-up pulse.

BRIEF DESCRIPTION OF THE DRAWING

The invention will be described further, by way of example, with reference to the accompanying drawing, in which:

FIG. 1a is a graphical presentation of the course of the rotational speeds of the low and high rear wheels for a relatively low coefficient of friction at which a low pressure level is reached;

FIG. 1b is a graphical presentation, above the same time scale, of the course of the brake pressures in the brakes of the low and high rear wheels;

FIGS. 2a and 2b are presentations corresponding to FIG. 1, yet assuming a high coefficient of friction, a correspondingly high pressure level, and a relatively short pressure decreasing period, the time scale in FIG. 2 being stretched approximately by a factor of 4 as compared to FIG. 1;

DESCRIPTION OF THE PREFERRED EMBODIMENTS

Figure 4A:
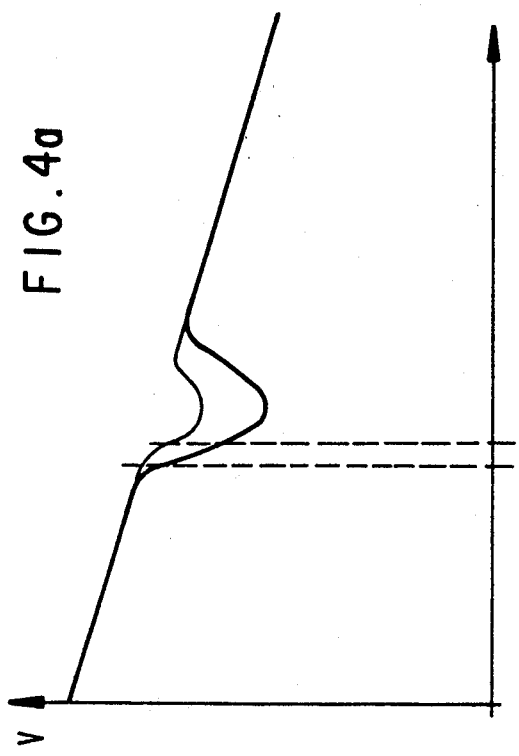
FIGS. 4a and 4b are a presentation similar to FIGS. 1 to 3, assuming that both rear wheels become unstable and need a pressure build-up.

FIG. 1a is the usual kind of presentation of the course of the rotational speeds of the rear wheels HL and HR of a four-wheel vehicle. The right rear wheel HR is assumed to move on relatively smoother ground than the left rear wheel HL. The designations "low" and "high" in the drawing are chosen accordingly.

FIG. 1b shows the corrresponding course of the brake pressures at the low and high rear wheels, above the same time scale. A relatively low coefficient of friction of the road surface is assumed, in other words the prevailing pressure level is rather low (cf. FIG. 2).

At time $t_0$ the slip measured or the rotational retardation of the low wheel HR indicates that a release of pressure is required since the wheel is becoming unstable. At this particular point in time the high wheel still is stable. In the embodiment illustrated in FIG. 1 the high wheel never becomes unstable.

At time $t_1$ the measured values relating to the low wheel indicate that the pressure must be kept constant.

From time $t_0$ on, the high rear wheel is maintained at unvarying brake pressure for a predetermined period of time $\Delta t$ of, for instance, 40 milliseconds. Thereafter the pressure at the high wheel is lowered until time $t_1$. Beginning at time $t_1$, the pressure is kept constant also at the high rear wheel, yet this occurs at a higher level than the brake pressure of the low rear wheel HR. In this manner a rather high braking effect is achieved by the high rear wheel. And the difference between the brake torques is smaller, as compared to conventional select-low control.

At time $t_2$ the computer of the ABS control system determines that the low wheel begins once more to run in a stable range of the coefficient of friction/slip curve. Therefore, at time $t_2$, the pressure is reduced also at the high rear wheel so that, at time $t_3$, it will be at the same level as the brake pressure at the low rear wheel. At time $t_3$ the brake pressures are raised in common at both wheels Hl and HR.

FIG. 2 illustrates the case of a relatively high coefficient of friction (good grip of the road surface) and correspondingly high pressure levels and short pressure decreasing times. The time scale of FIG. 2 is stretched out quite a bit as compared to FIG. 1, such as by a factor of 4 to 5, as may be seen from the time period $\Delta t$ which is the same in both cases, namely e.g. 40 ms.

The low wheel recovers rather quickly because of the good coefficient of friction, namely before the expiration of the 40 milliseconds, so that no adjustment for the brake pressure at the high wheel takes place at the end of the predetermined period of time $\Delta t$ (40 ms). As illustrated in FIG. 2b, in this case the brake pressure at the high rear wheel HL is lowered at time $t_2$, which is just (a few milliseconds) before the beginning ($t_3$) of the raising of pressure at the low rear wheel. Both brake pressures, at HL and HR, are brought to the same level.

A comparison of FIGS. 1 and 2 makes it evident that in the latter case a rather great difference in pressure is maintained over a rather long period of time between the high and low rear wheels. That has the advantage of providing a rather good braking effect by the high rear wheel. Still, good lateral guidance of the vehicle is maintained because of the assumed good coefficients of friction. No dangerous yaw moment about the vertical axis of the vehicle can develop because the difference is made smaller between the brake moments at the rear axle wheels.

Figure 3A:
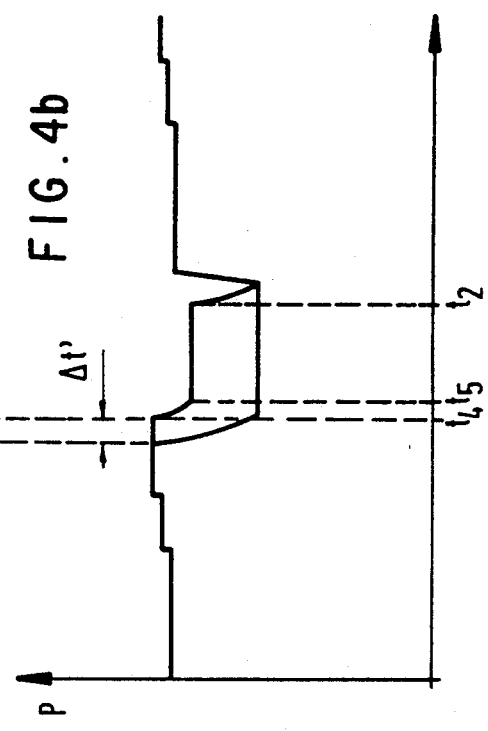
FIGS. 3a and 3b are a presentation similar to FIGS. 1 and 2, assuming a relatively high coefficient of friction and relatively great reacceleration of the low wheel.
Figure 3B:
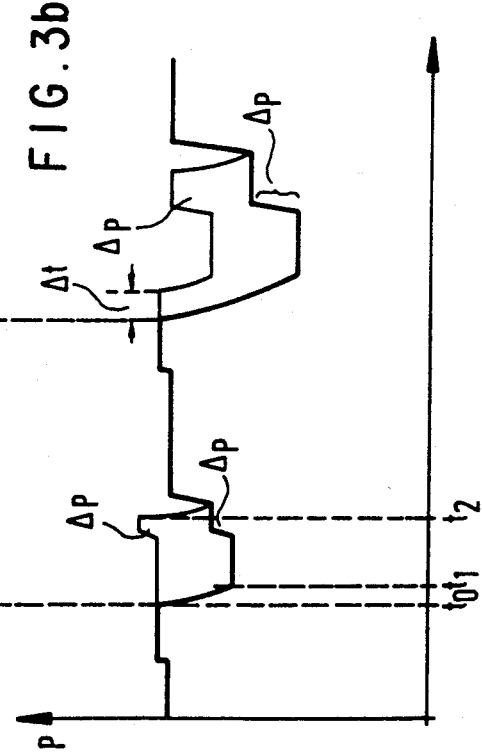

FIG. 3 shows conditions which likewise require a high coefficient of friction. In both control cycles illustrated in FIG. 3 the low wheel is accelerated more than a given threshold value. That is an indication that the low wheel has regained a good road surface. Therefore, the brake pressure may be increased to obtain a shorter stopping distance, without any risk of losing stability. That is what is shown in FIG. 3b. Both the high rear wheel and the low rear wheel receive a short pressure pulse $\Delta p$ which, however, is greater yet in the second control cycle according to FIG. 3 than in the first one for being a function of the renewed acceleration measured. In the second control cycle, as shown in FIG. 3b, the given period of time Δt (40 ms) is reached, i.e. the brake pressure at the high wheel is reduced upon expiration of the period of time Δt.

Figure 4B:
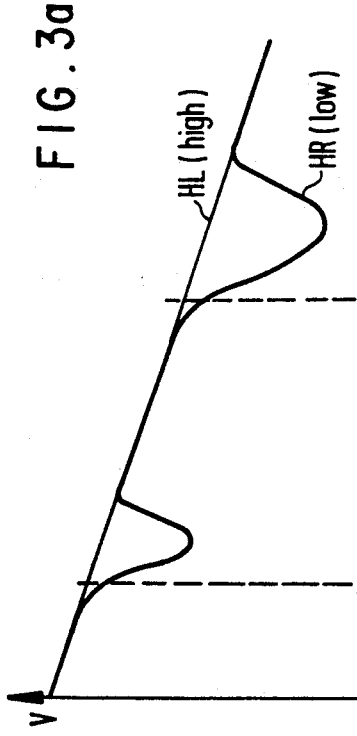

With FIG. 4, it is assumed that both wheels become unstable because of the separately detected values of slip and rotational retardation so that independent pressure reduction requirements must be met for the two wheels. In this event the demand for a pressure decrease at both wheels has the utmost priority. In the case of the embodiment shown in FIG. 4b the period of time Δt' is shorter than or equal to the predetermined period of time Δt. Following time period Δt', the measurement of the rotational behavior of the high wheel at time $t_4$ shows that this wheel is becoming unstable and consequently requires independent lowering of its pressure. At time $t_5$, the measurements reveal that the brake pressure must be maintained at an unvarying level, as shown in FIG. 4b. At time $t_2$ the brake pressures are harmonized, as described above.

Figure 5:
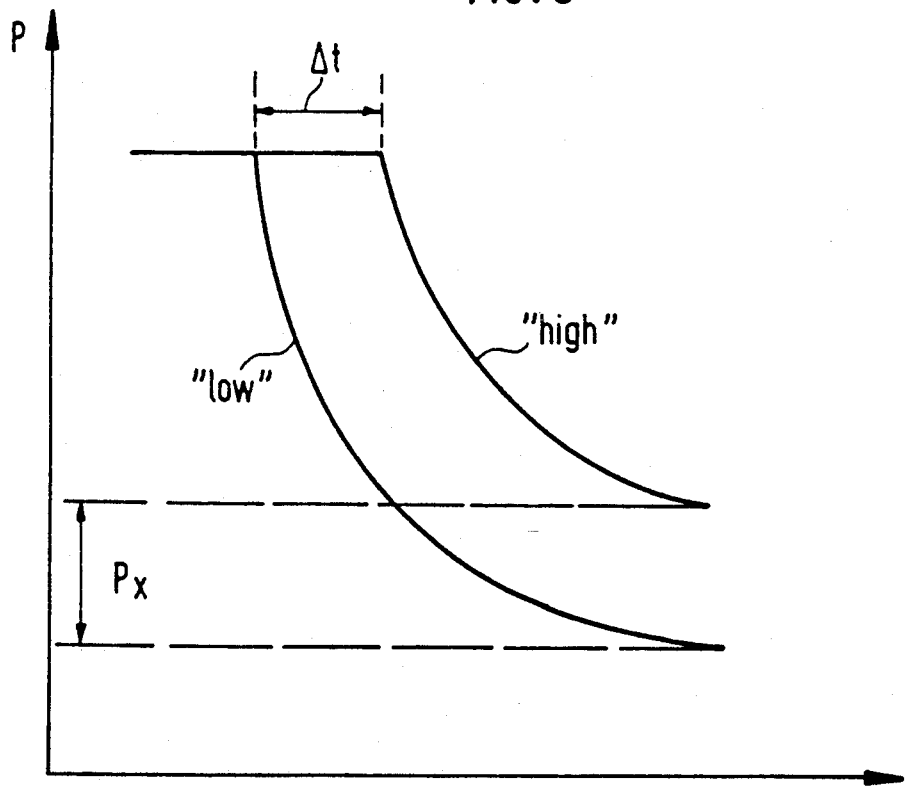
FIG. 5 illustrates relatively long lowering of pressure both at the low and high rear wheels with a high degree of harmonization of the prevailing brake pressures.

FIG. 5 illustrates the conditions of a rather long lowering of pressure in correspondence with a rather low coefficient of friction. As illustrated, the brake pressures of the high and low rear wheels in this instance are harmonized a great deal, as compared with FIG. 2, for instance, so that the differences of the brake torques at the left and right sides of the vehicle are relatively small. That takes into account the rather smooth road surface and prevents a torque about the vertical axis of the vehicle.

Figure 6A:
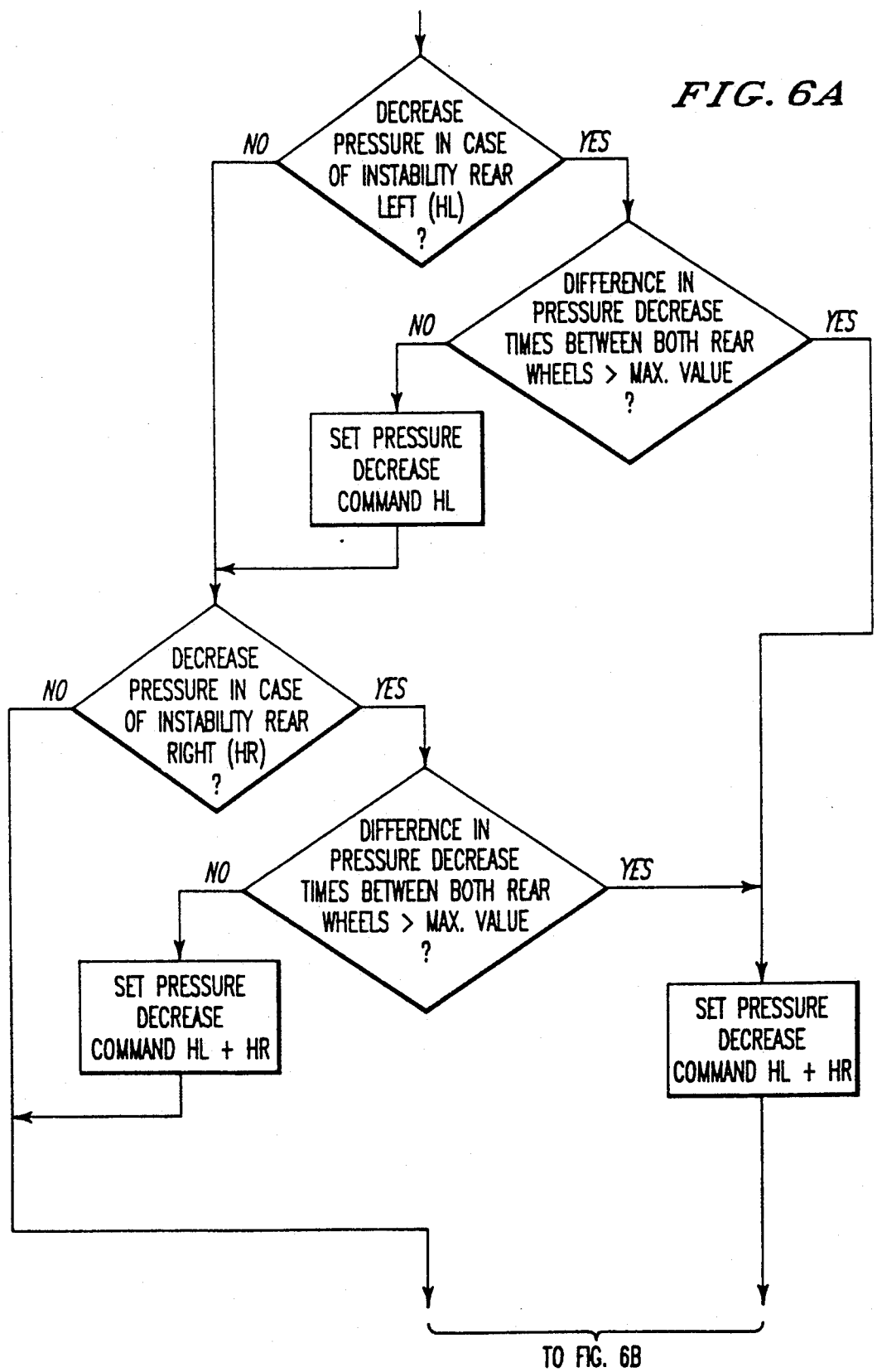
FIGS. 6a, 6b and 6c depict a flow chart of how to carry out a control algorithm according to the invention.
Figure 6B:
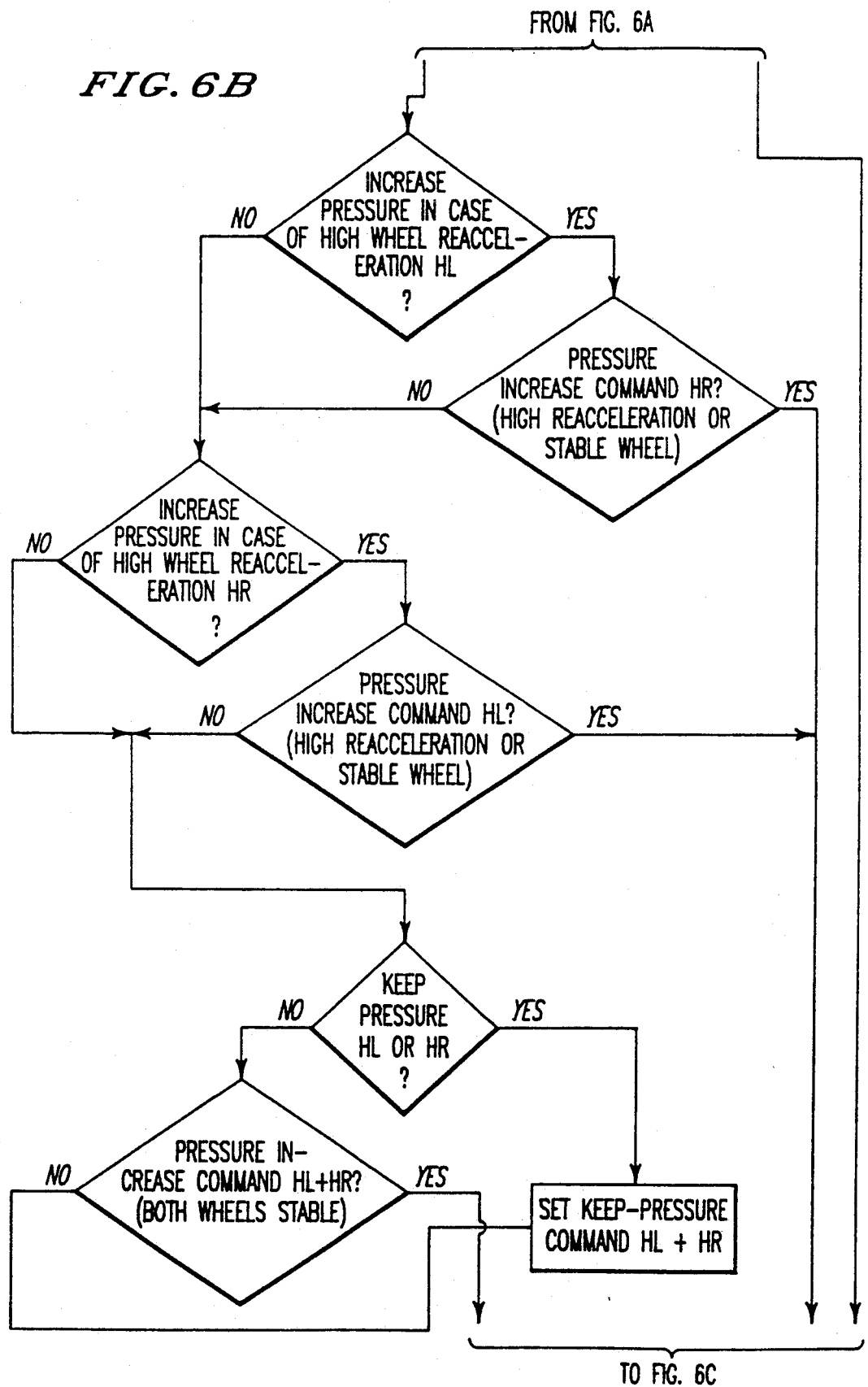
Figure 6C:
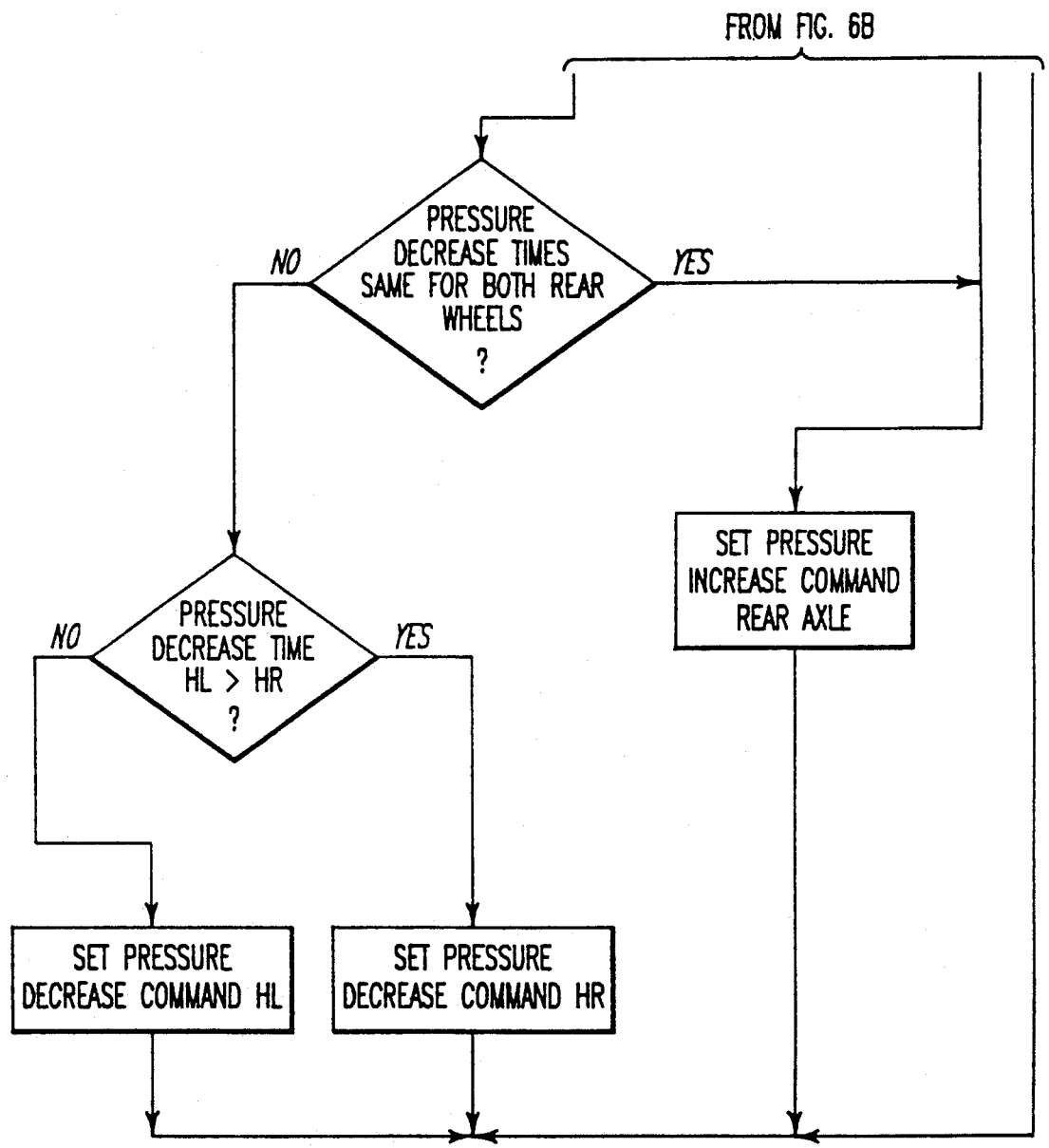

FIG. 6 is a flow chart illustrating the software implementation of an ABS algorithm described above.

What is claimed is:

1. A method of controlling brake pressure in rear wheel brakes of a double-track vehicle, wherein the rotational speed of at least each of the rear wheels are measured and the brake pressure is changed depending on the state of stability of individual wheels of the rear wheels, the pressure in the brake of a stable rear wheel being approximated initially and at least temporarily to the pressure in the brake of an unstable rear wheel, characterized in that, upon initiating a pressure decrease in the brake of said unstable rear wheel, the pressure in the brake of the stable rear wheel is kept constant for a predetermined period of time (Δ t) and is subsequently lowered when said unstable rear wheel is still unstable until a time ($t_1$) is reached at which the pressure in the brake of the unstable wheel is changed from a state in which it is lowered to a state in which it is maintained constant.

2. A method of controlling brake pressure in rear wheel brakes of a double-track vehicle, wherein the rotational speeds of at least each of the rear wheels are measured and the brake pressure is changed depending on the state of stability of individual wheels of the rear wheels, pressure in the brake of a stable rear wheel being approximated initially and at least temporarily to the pressure in the brake of an unstable rear wheel, characterized in that, upon initiating a pressure decrease in the brake of said unstable rear wheel, the pressure in the brake of the stable rear wheel is kept constant for a predetermined period of time (Δ t) and is subsequently lowered until a time ($t_3$) is reached at which the pressure in the brake of the unstable wheel is changed from a state to which it was lowered to a state in which it is raised.

3. The method as claimed in claims 1 or 2, characterized in that, just before initiating a pressure increase in the brake of a previously unstable wheel, the brake pressure in the brake of the stable wheel is approximated to the pressure in the brake of the previously unstable wheel, and in that subsequently the brake pressure in both brakes is increased.

4. The method as claimed in claims 1 or 2, characterized in that the predetermined period of time is from 20 to 80 milliseconds.

5. The method as claimed in claim 3, characterized in that the predetermined period of time is from 30 to 50 milliseconds.

6. The method as claimed claims 1 or 2, characterized in that, just before initiating a pressure increase in the brake of the wheel being unstable for the moment, the pressure in the brake of the stable wheel is approximated to the pressure in the brake of the wheel being unstable for the moment if the wheel being unstable for the moment becomes stable again before the predetermined period of time (Δt) from initiation of the pressure decrease in the brake of the wheel being unstable for the moment has lapsed, and in that subsequently the brake pressures in both brakes are increased together.

7. The method as claimed in claims 1 or 2, characterized in that at least one pressure build-up pulse (Δp) is provided in at least one of the brakes of the stable wheel and the wheel being unstable for the moment in the event that, following the pressure decrease, a wheel being unstable for the moment experiences reacceleration which is greater than a predetermined value.

8. The method as claimed in claims 1 or 2, characterized in that, when initiating a pressure increase in the brake of a previously unstable wheel, the brake pressure in the brake of the stable wheel is approximated to the pressure in the brake of the previously unstable wheel, and in that subsequently the brake pressure in both brakes is increased.

9. The method as claimed in claims 1 or 2, characterized in that, when initiating a pressure increase in the brake of the wheel being unstable for the moment, the pressure in the brake of the stable wheel is approximated to the pressure in the brake of the wheel being unstable for the moment if the wheel being unstable for the moment becomes stable again before the predetermined period of time (Δt) from the initiation of the pressure decrease in the brake of the wheel being unstable for the moment has lapsed, and in that subsequently the brake pressures in both brakes are increased together.

* * * * *